Jan. 4, 1949.  J. VOLKER  2,458,323
ELECTRICAL WARNING LIGHT SYSTEM FOR MOTOR VEHICLES
AND A SWITCH FOR USE IN SUCH SYSTEMS
Filed June 28, 1946  2 Sheets-Sheet 1
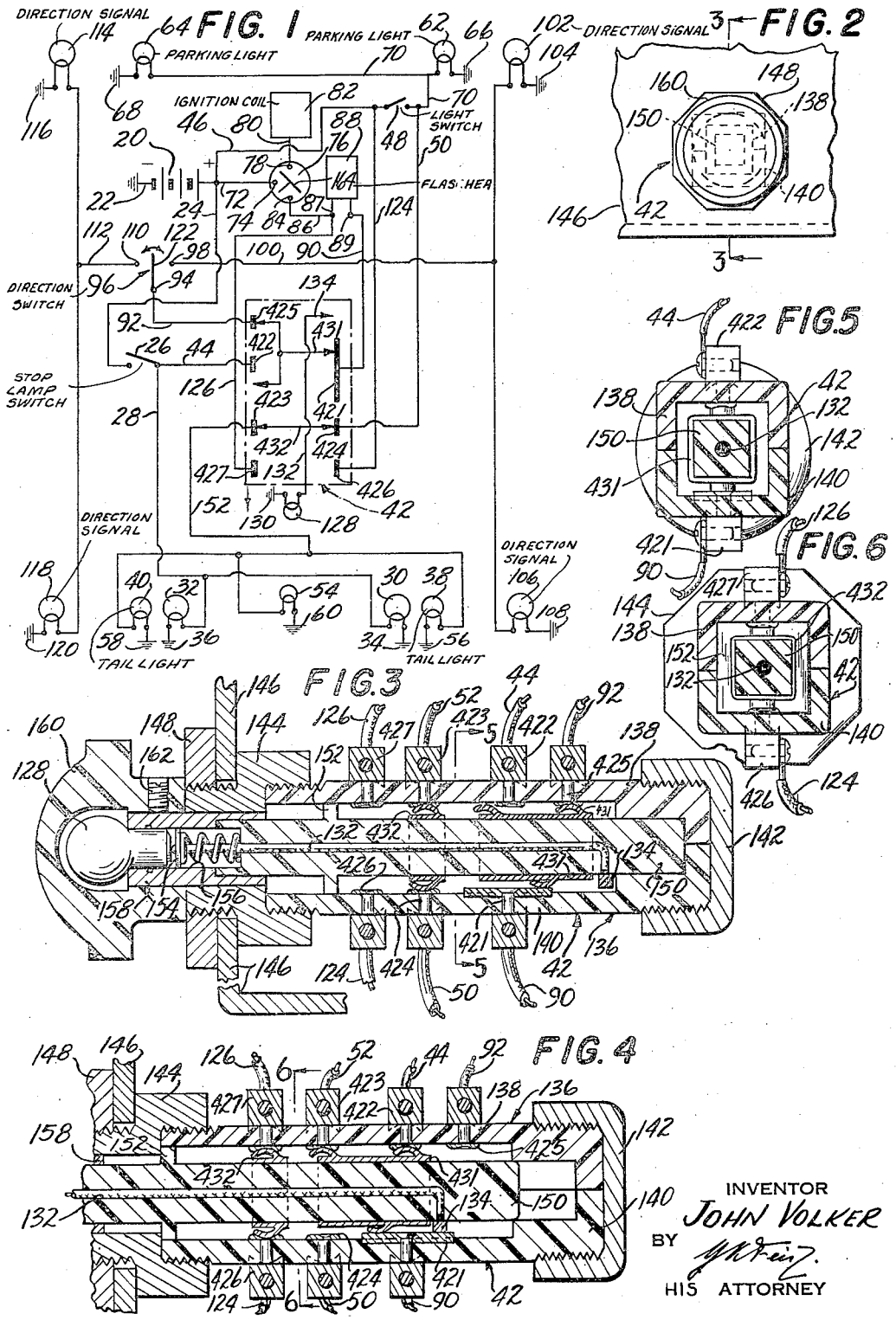
INVENTOR
JOHN VOLKER
BY
HIS ATTORNEY Jan. 4, 1949.     J. VOLKER     2,458,323
ELECTRICAL WARNING LIGHT SYSTEM FOR MOTOR VEHICLES
AND A SWITCH FOR USE IN SUCH SYSTEMS
Filed June 28, 1946     2 Sheets-Sheet 2
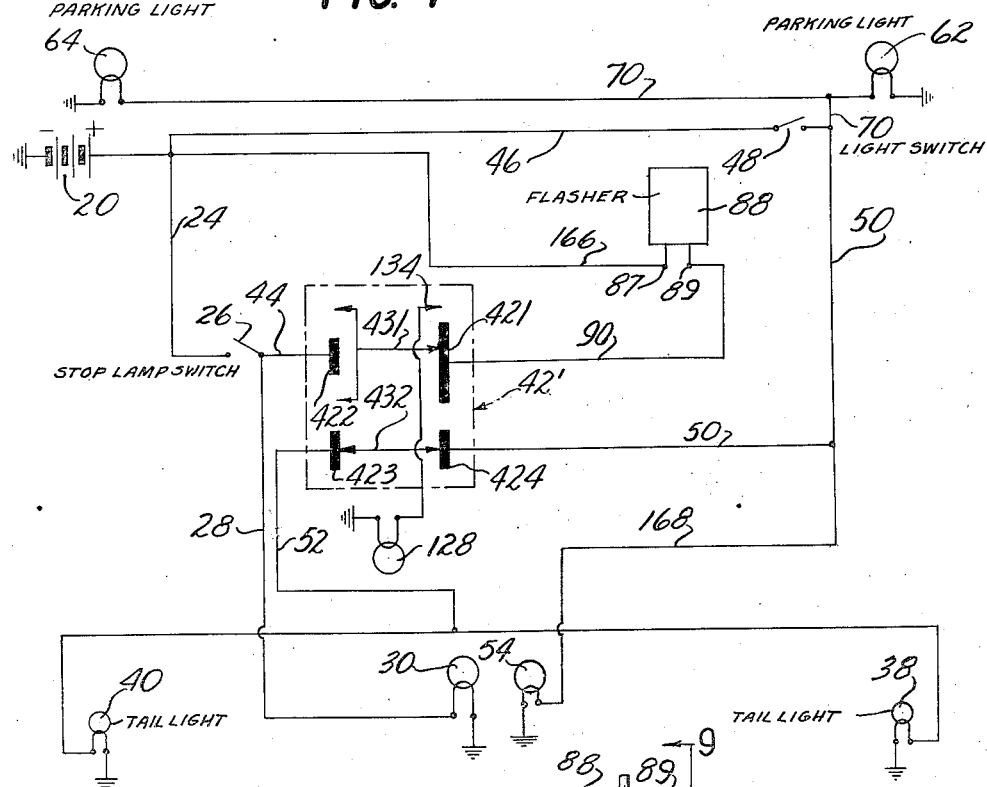
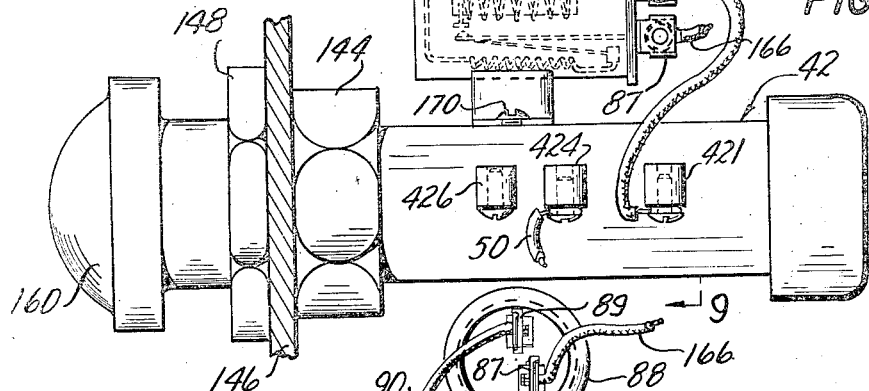
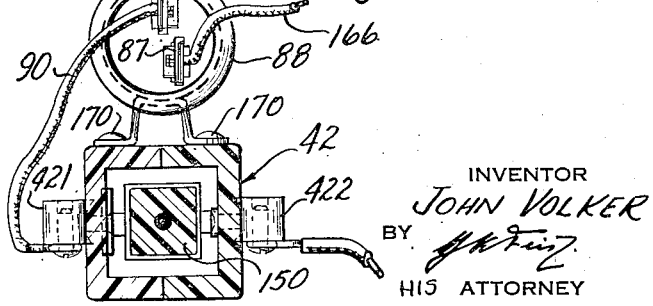
INVENTOR
JOHN VOLKER
BY
HIS ATTORNEY Patented Jan. 4, 1949

2,458,323

UNITED STATES PATENT OFFICE 2,458,323

ELECTRICAL WARNING LIGHT SYSTEM FOR MOTOR VEHICLES AND A SWITCH FOR USE IN SUCH A SYSTEM

John Volker, Brooklyn, N. Y.

Application June 28, 1946, Serial No. 679,980

7 Claims. (Cl. 177—337)

1

My invention relates to motor vehicles and more particularly to an electrical warning light system for motor vehicles.

Statistics show that many fatal accidents occur during dusk or dark of night, when a driver has to stop his motor vehicle for one of many reasons, on a street, parkway, or highway. All too often oncoming drivers of other motor vehicles either take no notice of such a stalled motor vehicle at all, or notice same when it is too late.

The main reason for such rear-on accidents is that the operator of the disabled motor vehicle does not display a warning signal at all, or that the tail lights of the stalled motor vehicle fail to attract sufficient attention, or are mistaken by the approaching driver.

An object of the present invention is to provide an effective electrical warning light system for motor vehicles, by means of which such hazards as mentioned above may be reduced to a minimum.

A further object of the present invention is to provide an electrical warning light system for motor vehicles, by means of which a maximum of protection may be given to the driver of a stalled motor vehicle, before he steps out of his motor vehicle.

Another object of the present invention is to provide an electrical warning light system for motor vehicles which does not require any additional lamp equipment on the motor vehicle.

A further object of the present invention is to provide a motor vehicle with a warning light system by means of which the standard rear lighting equipment of a motor vehicle may be readily converted into a warning light system by the use of a warning light switch mounted on the dashboard.

Still another object of the present invention is to provide a motor vehicle with a warning light system, by means of which interrupted current may be applied to all tail and stop lights so as to transform same to warning lights, irrespective of whether the head or parking lights are switched on or off.

A further object of the present invention is to provide an electric switch for use in an electrical warning light system of motor vehicles.

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of this specification, wherein:

Fig. 1 is a diagram of an electrical warning light system for a motor vehicle according to the invention, Fig. 2 is a front elevational view of an electric switch for use in an electrical warning light system according to the invention, said switch being shown mounted on the dashboard of the motor vehicle, Fig. 3 is a sectional view of the switch taken on line 3—3 of Fig. 2, Fig. 4 is a fragmentary sectional view of the switch similar to that shown in Fig. 3, wherein, however, the bridging contact members of the switch are in a different position, Fig. 5 is a sectional view taken on line 5—5 of Fig. 3, Fig. 6 is a sectional view taken on line 6—6 of Fig. 4, Fig. 7 is a diagram of a different embodiment of an electrical warning light system for a motor vehicle according to the invention, Fig. 8 is a side elevational view of a switch for use in the electrical warning light system shown in Fig. 7, and Fig. 9 is a sectional view taken on line 9—9 of Fig. 8.

Referring now to Fig. 1, 20 generally indicates the battery of a motor vehicle. One pole of said battery is connected with the ground (body of the motor vehicle) by a line 22, the other pole of said battery is connected by a line 24 with one terminal of a stop lamp switch 26. The other terminal of said stop lamp switch 26 is connected by a line 28 with the right-hand stop lamp 30 and the left-hand stop lamp 32 of the motor vehicle. The right-hand stop lamp 30 is grounded at 34, the left-hand stop lamp 32 is grounded at 36. The circuit including the lines 24, 28, the stop lamp switch 26, and the stop lamps 30 and 32 may be called the "stop lamp circuit."

Above mentioned stop lamp switch 26 is coupled with the spring loaded brake pedal of the motor vehicle in a manner known per se in such a way, that upon a depressing of the brake pedal for the application of the brakes of the motor vehicle the stop lamp switch 26 is automatically closed, and that upon a release of the brake pedal for the release of the brakes the stop lamp switch 26 is automatically opened. The stop lamp switch may be of any conventional construction, for example the stop lamp switch may be of the hydraulic type arranged in the line of the hydraulic brake system for actuation by the liquid of the hydraulic system. Thus, the stop lamp switch is normally held in open position as shown in Fig. 1, and is closed only for the duration of the application of the brakes.

Fig. 1 illustrates a separate right-hand stop lamp 30 and a separate right-hand tail light 38; likewise, Fig. 1 illustrates a separate left-hand stop lamp 32 and a separate left-hand tail light 40. If desired, however, each of said stop lamps and tail lights may form a part of a lamp body with a double filament bulb having a 21 C. P. (candle power) filament for the stop light and a 3 C. P. filament for the tail light.

42 generally indicates a warning light switch having seven terminals 421, 422, 423, 424, 425, 426, 427 and two bridging contact members 431 and 432.

The terminal 422 of the warning light switch 42 is connected by a line 44 with the line 28 of the stop lamp circuit between the stop lamp switch 26 and the stop lamps 30 and 32.

Furthermore, one pole of the battery 20 is connected by a line 46 with one terminal of a light switch 48 of conventional construction. The other terminal of said light switch 48 is connected by a line 50 with the terminal 424 of the warning light switch 42. The terminal 423 of said warning light switch 42 is connected by a line 52 with the tail lights 38 and 40 and with a license-plate lamp 54. The tail light 38 is grounded at 56, the tail light 40 is grounded at 58, and the license-plate lamp 54 is grounded at 60. The circuit including the line 46, the light switch 48, the line 50, the line 52, the tail light 38, 40 and the license-plate lamp 50 may be called the "tail light circuit."

62 indicates the right-hand parking light and 64 indicates the left-hand parking light (the headlights are not shown in Fig. 1). The right-hand parking light 62 grounded at 66 and the left-hand parking light 64 grounded at 68 are connected with one terminal of the light switch 48 by a line 70. Moreover, one pole of the battery 20 is connected by a line 72 with the terminal 74 of the ignition switch 76. The terminal 78 of said ignition switch 76 is connected by a line 80 with an ignition coil 82. The terminal 84 of the ignition switch 76 is connected by a line 86 with the pole 87 of a current intermitter or "flasher" 88. The other pole 89 of said current intermitter 88 is connected by a line 90 with the terminal 421 of the warning light switch 42. The terminal 425 of said warning light switch 42 is connected by a line 92 with the terminal 94 of a directional light switch 96 which may be of any conventional construction. The terminal 98 of said directional light switch is connected by a line 100 with a right-hand front directional light 102 grounded at 104 and a right-hand rear directional light 106 grounded at 108. The terminal 110 of the directional light switch 96 is connected by a line 112 with a left-hand front directional light 114 grounded at 116 and a left-hand rear directional light 118 grounded at 120. The bridge 122 of the directional light switch 96 may be brought either into the neutral position shown in Fig. 1 or into contact with the terminal 98 or into contact with the terminal 110. The circuit including the line 72, the line 86, the current intermitter 88, the line 90, the line 92, the directional light switch 96, the lines 100 and 112 and the directional lights 102, 106, 114, 118 may be called a "directional light circuit."

The line 46 between the battery 20 and the light switch 48 is connected by a line 124 with the terminal 426 of the warning light switch 42. The terminal 427 of said warning light switch 42 is connected by a line 126 with the pole 87 of the current intermitter 88. The circuit including the lines 124 and 126 may be called an "auxiliary circuit."

128 indicates an indicator lamp grounded at 130. Said indicator lamp is connected by a line 132 with a contact element 134 of the warning light switch 42.

Figs. 2-6 illustrate a preferred construction of a warning light switch 42 for use in above described electrical warning light system. Said warning light switch comprises a split supporting casing 136 consisting of the parts 138 and 140 of insulating material. Said parts 138 and 136 are held together by a cap 142 screwed on a threaded end thereof. The other end of said casing 136 is screwed into a bushing 144 of conductive material. The terminals 425, 422, 423, 427 are secured to the portion 138 of the casing 136. The terminals 421, 424, 426 are secured to the portion 140 of the casing 136.

When the warning light switch 42 is mounted on the dashboard 146 by means of a nut 148 of conductive material screwed on the bushing 144, the terminal 425 may be connected by a wire 92 with the directional light switch, the terminal 422 may be connected by a wire 44 with the stop lamp switch, the terminal 423 may be connected by a wire 52 with the tail lights and license-plate lamp and the terminal 427 may be connected by a wire 126 with one pole of the current intermitter; likewise, the terminal 421 may be connected by a wire 90 with the other pole of said current intermitter, the terminal 424 may be connected by a wire 50 with the light switch, and the terminal 426 may be connected by a wire 124 with the battery.

An actuating member or actuating rod 150 of insulating material is slidably arranged in the casing 136. One extreme position thereof, i. e. its "off"-position is limited by the abutment of its right-hand end against the casing 136 as shown in Fig. 3; the other extreme position of said actuating member 150, i. e. its "on"-position is limited by the abutment of a shoulder 152 against the bushing 144 as shown in Fig. 4.

The bridging contact members 431 and 432 are mounted on said actuating member 150. Furthermore, said actuating member 150 carries the contact element 134 connected with a spring loaded metallic disc 154 by an insulated wire 132 passing through a bore of the actuating member 150. Said spring loaded disc 154 is shiftably arranged in a bore 156 of a socket 158 of conductive material, attached to the actuating member 150. A terminal of the indicator lamp 128 inserted into the socket 158 may be brought into contact with a nipple or the like on the disc 154. The other terminal of said indicator lamp 128 is connected with the dashboard 146 (ground) through the conductive socket 158, bushing 144 and nut 148. An actuating knob 160 of translucent insulating material having a cavity for receiving the indicator lamp 128 is secured by a set screw 162 to the socket 158 rigidly connected with the actuating rod 150.

The terminals 421-427, the bridging contact members 431 and 432 and the contact element 134 are arranged in such a manner relative to each other, that the bridging contact member 431 connects the terminal 421 with the terminal 425, the bridging contact member 432 connects the terminal 423 with the terminal 424, and the contact element 134 is out of contact with the terminal 421, when the actuating rod 150 is in the "off"-position shown in Fig. 3, and that the bridging contact member 431 connects the terminal 421 with the terminals 422 and 423, the bridging contact member 432 connects the terminal 426 with the terminal 427, and the contact element is in contact with the terminal 421, when the actuating rod 150 is in the "on"-position shown in Fig. 4.

The operation of the system and the switch described above is as follows:

When the motor vehicle is in motion, the warning light switch 42 is in its "off"-position as shown in Figs. 1 and 3. Furthermore, the bridge 164 of the ignition switch 76 is brought into such a position, that it connects the terminal 74 with the terminals 78 and 84. Therefore, current is supplied from the battery 20 to the ignition coil 82 and through the current intermitter 88 and the bridging contact member 431 of the warning light switch 42 to the bridge 122 of the directional light switch 96. When the bridge 122 of said directional light switch 96 is brought into contact with the terminal 98, the right-hand directional lights 102 and 106 will flash on and off intermittently as long as the current intermitter 88 is connected through said bridge 122 with said right-hand directional lights. In a similar manner a flashing light will emanate from the left-hand directional lights 114 and 118, when the bridge 122 of the directional light switch 96 is connected with the terminal 110. When the bridge 122 is in the neutral position shown in Fig. 1, the directional lights 102, 106, 114 and 118 are shut off.

Furthermore, the stop lamps 30 and 32 will emanate a steady light as long as the stop lamp switch 26 is closed upon an actuation of the brake pedal.

Moreover, a closing of the light switch 48 will cause the emanation of a steady light from the front lights 62, 64, the tail lights 38, 40 and the license-plate lamp 54.

The indicator lamp 128 of the warning light switch 42 is shut off, as the contact element 134 is out of contact with the terminal 421 when the warning light switch is in the "off"-position shown in Fig. 1.

When it becomes necessary to park the motor vehicle on a street, road, or highway for a repair, the driver of the motor vehicle may pull out the actuating member 150 of the warning light switch into the "on"-position shown in Fig. 4, before he steps out of the motor vehicle. Now, the current intermitter 88 is disconnected from the terminal 425 connected with the directional light switch, and said current intermitter is connected instead through the terminals 422 and 423 with the stop lights 30, 32, tail lights 38, 40, and license-plate lamp 54, so that a bright flashing warning signal emanates from said stop lamps, tail lights, and license plate lamp, which will effectively attract the attention of the driver of a motor vehicle approaching from the rear. The stop lights, tail lights, and license plate lamp will continue to flash warning signals even after the shutting off of the motor by returning the bridge 164 of the ignition switch 76 into the position shown in Fig. 1, as now the bridging contact member 432 of the warning light switch, after an interruption of the tail light circuit connects the terminals 426 and 427 with each other, whereby the auxiliary circuit is closed for a direct supply of current from the battery through the lines 46, 124, 126 to the pole 87 of the current intermitter 88. Furthermore, a flashing light will emanate from the indicator lamp 128 of the warning light switch 42, as now the contact element 134 is in contact with the terminal 421 connected with the current intermitter 88. Said indicator lamp 128 will remind the operator of the motor vehicle to return the warning light switch 42 into its "off"-position shown in Figs. 1 and 3 as soon as there is no longer need for above described warning signals.

According to Fig. 1, the license plate lamp 54 is connected with the terminal 423 of the warning light switch through the line 52. If desired, however, the license plate lamp 54 may be directly connected with the light switch 48, so that the switching on of the warning light switch will not cause the emanation of a flashing light from the license plate lamp.

As will be readily understood from above, the warning light system will be in operation by the switching on of the warning light switch 42 irrespective of whether the light switch 48 is switched on or off for a switching on or shutting off of the front lights 62 and 64, and, of course of the license-plate lamp 54 if the latter is directly connected with the light switch 48.

Fig. 7 illustrates a different embodiment of an electrical warning light system for motor vehicles which are not equipped with directional lights.

According to Fig. 7, again the stop lamp circuit 24, 26, 28, 30 is connected with the battery 20. Likewise, the tail light circuit 46, 48, 50, 52, 38, 40 is connected with said battery 20. The front lights 62, 64 are connected with one terminal of the light switch 48 by the line 70.

42' generally indicates the warning light switch. The terminal 424 of said warning light switch is connected with a line 50 of said tail light circuit, and the terminal 423 of said warning light switch 42 is connected with the line 52 of the tail light circuit.

The terminal 422 of the warning light switch 42' is connected by the line 44 with the line 28 of the stop lamp circuit between the stop lamp switch 26 and the stop lamp 30. The terminal 421 of the warning light switch 42' is connected by the line 90 with the pole 89 of the current intermitter 88, the other pole 87 of which is connected by a line 166 with the battery 20. The circuit including the line 166, the current intermitter 88, the line 90 and the line 44 may be called a "current intermitter circuit," which is arranged in shunt to the stop lamp switch 26.

The license plate lamp 54 is connected by a line 168 with the line 50 of the tail light circuit between the light switch 48 and the terminal 424.

When the warning light switch 42 is in the "off"-position shown in Fig. 7, its bridging contact member 431 is in such a position relative to the terminals 421 and 422, that it interrupts the current intermitter circuit, its bridging contact member 432 is in such a position relative to the terminals 423 and 424, that it closes the tail light circuit, and its contact element 134 connected with the indicator lamp 128 is out of contact with the terminal 421. Therefore, said indicator lamp 128 does not light up, and a steady light will emanate from the stop lamp 30 is long as the stop lamp switch 26 is closed, and likewise a steady light will emanate from the tail lights 38, 40, the license plate lamp 54, and the front lights 62, 64 as long as the light switch 48 is closed.

When the warning light switch 42 is brought into its "on"-position, the bridging contact members 431, 432, and the contact element 134 are displaced relative to the terminals of the warning light switch in the same manner as described above in connection with the warning light switch 42 shown in Figs. 3 and 4, so that now the bridging contact member 431 connects the terminal 421 with the terminals 422 and 423, the bridging contact member 432 interrupts a connection between the terminals 423 and 424, and the contact element 134 is in contact with the terminal 421. Therefore, now the current intermitter 88 is connected with the stop lamp 30 and the tail lights 38 and 40 so as to cause the emanation of flashing warning signals therefrom; furthermore, a flashing light will emanate from the indicator lamp 128. As the tail light circuit is interrupted at 424, the closing of the light switch 48 will cause the emanation of a steady light only from the license plate lamp 54 and the front lights 62 and 64.

Of course, if desired, the license plate lamp 54 could be connected with the line 52 of the tail light circuit corresponding to the connection of the license plate lamp 54 in the system shown in Fig. 1. In such a case the switching on of the warning light switch 42' would also cause the emanation of a flashing warning light from the license plate lamp 54.

The warning light switch 42' shown in Fig. 7 has only four terminals 421, 412, 423, and 424. If desired, however, the warning light switch 42 having seven terminals 421–427 as shown in Figs. 2–6 may be used in the warning light system according to Fig. 7. In such a case the terminals 425, 426 and 427 remain unconnected.

Furthermore, as shown in Fig. 8, the current intermitter 88 may be directly mounted on the warning light switch, for example a warning light switch 42 of the type shown in Figs. 2–6, by means of screws 170.

The term "motor vehicle" used in the specification and claims is to be understood in its broadest sense as a self-propelled vehicle suitable for use on a street or roadway.

I have described preferred embodiments of my invention, but it is understood that numerous changes and omissions may be made without departing from the spirit or scope of the invention, set forth in the appended claims.

What I claim is:

1. An electrical warning light system for motor vehicles comprising: a source of electrical current, a stop lamp circuit connected with said source of electrical current, said stop lamp circuit including a stop lamp switch and at least one stop lamp, a tail light circuit connected with said source of electrical current, said tail light circuit including a light switch and a plurality of tail lights, a current intermitter circuit including a current intermitter, said current intermitter circuit being connected with said stop lamp circuit in shunt to said stop lamp switch, and a warning light switch having at least four terminals and two mechanically connected movable bridging contact members arranged for cooperation with said terminals, two terminals of said warning light switch being arranged in said current intermitter circuit and two other terminals of said warning light switch being arranged in said tail light circuit, said bridging contact members of said warning light switch interrupting said current intermitter circuit and closing said tail light circuit in the "off"-position of the warning light switch, and said bridging contact members interrupting said tail light circuit and connecting said current intermitter with the stop lamp and the tail lights in the "on"-position of the warning light switch.

2. In an electrical warning light system as claimed in claim 1, an indicator lamp, and a contact element in the warning light switch, said contact element being electrically connected with said indicator lamp and being arranged for connecting said indicator lamp with the current intermitter when the warning light switch is in its "on"-position.

3. In an electrical warning light system as claimed in claim 1, said tail light circuit including a license-plate lamp, and said bridging contact members connecting said license-plate lamp with the current intermitter when the warning switch is in its "on"-position.

4. An electrical warning light system for motor vehicles comprising: a source of electrical current, a stop lamp circuit connected with said source of electrical current, said stop lamp circuit including a stop lamp switch and at least one stop lamp, a tail light circuit connected with said source of electrical current, said tail light circuit including a light switch and a plurality of tail lights, a directional light circuit connected with said source of electrical current, said directional light circuit including a current intermiter, a directional light switch and a plurality of directional lights, and a warning light switch having at least five terminals and two mechanically connected movable bridging contact members arranged for cooperation with said terminals, two terminals of said warning light switch being arranged in said directional light circuit, two other terminals of said warning light switch being arranged in said tail light circuit, the fifth terminal of said warning light switch being connected to the line of said stop lamp circuit connecting the stop lamp switch with the stop lamp, said bridging contact members of said warning light switch closing said directional light circuit, disconnecting said stop lamp from said current intermitter and closing said tail light circuit when the warning light switch is in its "off"-position, and said bridging contact members disconnecting said directional light switch from said current intermitter, connecting said stop lamp with said current intermitter, interrupting said tail light circuit and connecting said tail lights with said current intermitter when the warning switch is in its "on"-position.

5. In an electrical warning light system as claimed in claim 4, an indicator lamp, and a contact element in the warning light switch, said contact element being electrically connected with said indicator lamp and being arranged for connecting said indicator lamp with the current intermitter when the warning light switch is in its "on"-position.

6. In an electrical warning light system as claimed in claim 4, said tail light circuit including a license-plate lamp, and said bridging contact members connecting said license-plate lamp with the current intermitter when the warning switch is in its "on"-position.

7. In an electrical warning light system as claimed in claim 4, an ignition switch arranged in the directional light circuit between the source of current and the current intermitter, and an auxiliary circuit connecting the current intermitter with the source of electrical current, said auxiliary circuit including an auxiliary switch, the bridging contact member of said auxiliary switch being coupled with the bridging contact members of the warning light switch so as to interrupt said auxiliary circuit when the warning light switch is in its "off"-position and so as to close said auxiliary circuit when the warning light switch is in its "on"-position.

JOHN VOLKER.

REFERENCES CITED

The following references are of record in the file of this patent:

UNITED STATES PATENTS

| Number | Name | Date |
| --- | --- | --- |
| 1,178,873 | Potter | Apr. 11, 1916 |
| 1,594,474 | Slayton | Aug. 3, 1926 |
| 1,683,496 | Stevens | Sept. 4, 1928 |
| 2,086,959 | Rom | July 13, 1937 |
| 2,091,470 | Douglas | Aug. 31, 1937 |
| 2,125,668 | Chase | Aug. 2, 1938 |
| 2,186,911 | Erickson | Jan. 9, 1940 |
| 2,203,502 | Michel | June 4, 1940 |
| 2,218,442 | Thurber | Oct. 15, 1940 |
| 2,386,120 | James | Oct. 2, 1945 |